(12) United States Patent
Sakhnini et al.

(10) Patent No.: US 11,659,518 B2
(45) Date of Patent: May 23, 2023

(54) PAGING PROCEDURES WITH INCREASED GRANULARITIES

(71) Applicant: QUALCOMM Incorporated, San Diego, CA (US)

(72) Inventors: Iyab Issam Sakhnini, San Diego, CA (US); Tao Luo, San Diego, CA (US); Linhai He, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/302,074

(22) Filed: Apr. 22, 2021

(65) Prior Publication Data

US 2021/0360579 A1 Nov. 18, 2021

Related U.S. Application Data

(60) Provisional application No. 63/024,486, filed on May 13, 2020.

(51) Int. Cl.
*H04W 24/10* (2009.01)
*H04W 68/00* (2009.01)
(Continued)

(52) U.S. Cl.
CPC ......... *H04W 68/005* (2013.01); *H04W 16/28* (2013.01); *H04W 24/10* (2013.01); *H04W 64/006* (2013.01)

(58) Field of Classification Search
CPC ... H04W 68/005; H04W 16/28; H04W 24/10; H04W 64/006; H04W 76/27;
(Continued)

(56) References Cited

U.S. PATENT DOCUMENTS

2019/0327669 A1* 10/2019 Liu ............... H04W 48/16
2020/0404619 A1* 12/2020 Zhang ............. H04B 7/0695

FOREIGN PATENT DOCUMENTS

CN 107920328 A 4/2018
WO 2019047958 A1 3/2019
(Continued)

OTHER PUBLICATIONS

International Search Report and Written Opinion—PCT/US2021/028928—ISA/EPO—Jul. 5, 2021.
(Continued)

*Primary Examiner* — Chuong A Ngo
(74) *Attorney, Agent, or Firm* — Danai Nelisile Mhembere; ArentFox Schiff LLP

(57) ABSTRACT

Provided herein are various techniques and solutions to paging user equipment (UE). In particular, paging at higher levels of granularity, such as a beam level, for low mobility or stationary UEs in inactive and/or idle states are described. An apparatus may be configured to receive, from a network, a message configuring at least one beam notification area associated with positioning of the apparatus. The at least one beam notification area may include a set of beams corresponding to a set of cells identified by the network as candidates for carrying a paging message for the apparatus in the at least one beam notification area. The apparatus may be further configured to receive the paging message from the network via one of the set of beams corresponding to one of the set of cells in which the apparatus is positioned based on the at least one beam notification area.

30 Claims, 9 Drawing Sheets

(51) Int. Cl.
*H04W 64/00* (2009.01)
*H04W 16/28* (2009.01)

(58) Field of Classification Search
CPC ...... H04W 68/04; H04W 4/70; H04B 7/0408; H04B 7/0617; H04B 7/0695; H04B 7/088
See application file for complete search history.

(56) References Cited

FOREIGN PATENT DOCUMENTS

| | | | | |
|---|---|---|---|---|
| WO | WO-2019047958 A1 | * | 3/2019 | ........... H04B 7/0408 |
| WO | 2021109039 A1 | | 6/2021 | |

OTHER PUBLICATIONS

Sequans Communications: "Reduced Overhead Paging Design", 3GPP TSG-RAN WG1 Meeting AH 1801, 3GPP Draft, R1-1800225 Reduced Overhead Paging Design, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22-Jan. 26, 2018, Jan. 12, 2018 (Jan. 12, 2018), 6 Pages, XP051384292.
Item 2 Continued: Retrieved from the Internet: URL: https://www.3gpp.org/ftp/tsg_ran/WG1_RL1/TSGR1_AH/NR_AH_1801/Docs/ [retrieved on Jan. 12, 2018], Section 2, The whole document.

\* cited by examiner

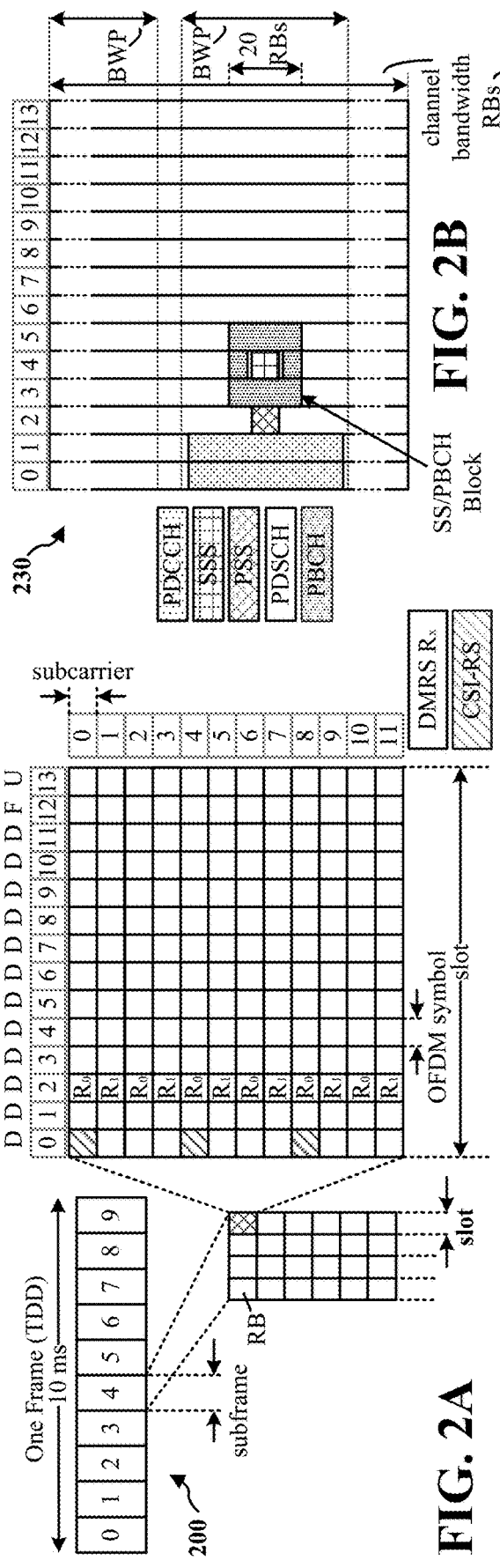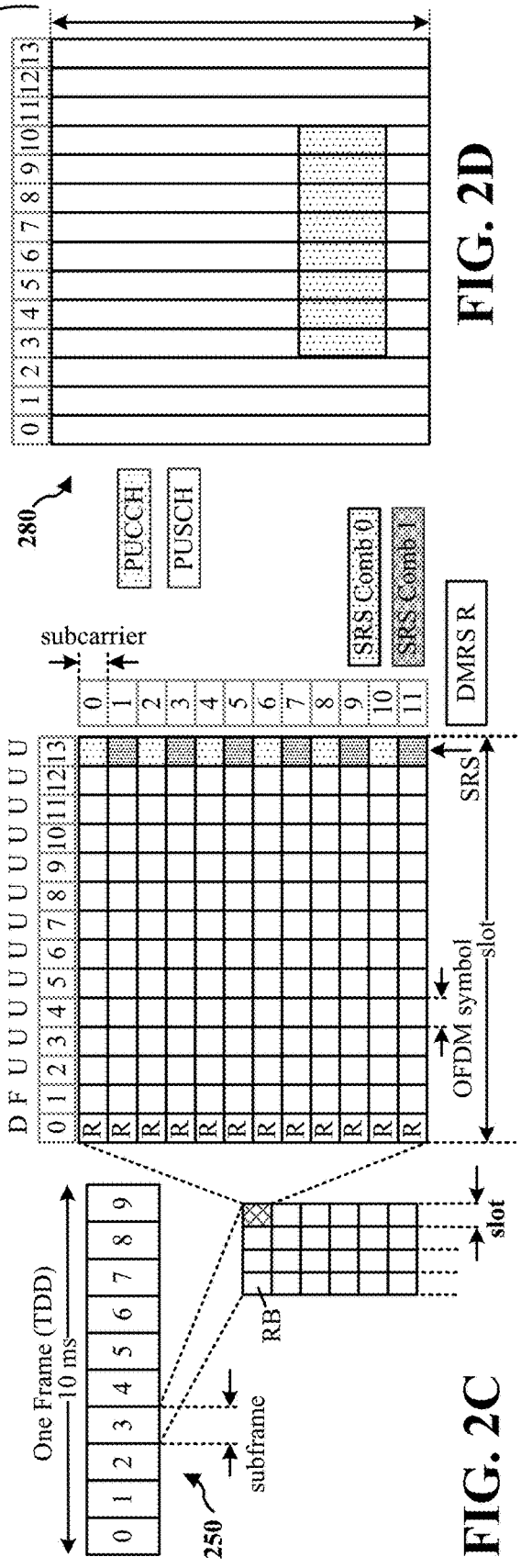

PAGING PROCEDURES WITH INCREASED GRANULARITIES

CROSS REFERENCE TO RELATED APPLICATION(S)

This application claims the benefit of U.S. Provisional Application Ser. No. 63/024,486, entitled "SYSTEM AND METHOD FOR BEAM-LEVEL PAGING OF USER EQUIPMENT IN INACTIVE OR IDLE STATES" and filed on May 13, 2020, the disclosure of which is expressly incorporated by reference herein in its entirety.

BACKGROUND

Technical Field

The present disclosure generally relates to communication systems, and more particularly, to various procedures for network paging of devices at high levels of granularity, such as at a beam level.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various radio access networks (RANs), such as 5G NR networks, communication with some user equipment (UE) may be initiated by paging. In order to establish where a UE is to be paged, the UE may register with a network so that the UE's position is known and the UE can be paged in the appropriate area. In particular, the UE may be tracked at the level of a core network and/or the level of a radio access network (RAN).

At the level of the core network, a UE may perform a tracking area registration procedure, during which the UE may be assigned a UE Registration Area. The UE Registration Area may be associated with a set of tracking area identifiers (TAIs). Each TAI may be associated with one or more RAN areas, e.g., so that the UE may be tracked at the RAN level. Each RAN area may be identified by a corresponding RAN area identifier (RAI). An RAI may indicate a set of cells in which the UE may be located. In addition, the UE may be assigned a RAN Notification Area, which may include a sets of RAIs, TAIs, and/or cell IDs in which the UE may be located.

In the UE moves to a new cell that is not included in the assigned RAN Notification Area, the UE may perform a radio resource control (RRC) RAN Notification Area Update procedure with the network. In response, the network may assign the UE a new RAN Notification Area, which may include the new cell to which the UE moved. Similarly, when the UE moves to the new cell and the new cell is not included in the UE Registration Area assigned to the UE, the UE may perform a non-access stratum (NAS) Registration Update procedure with the network. For the NAS Registration Update, the network may assign the UE a new UE Registration Area, which may indicate a set of TAIs that includes the new cell.

When the UE is operating in an active and/or connected state, the UE may be actively connected with the network and, therefore, the network may know where the UE is located at the core network and RAN levels, and also at a beam level—e.g., as the UE may be actively connected with a base station and using at least one beam to communicate with the base station. Therefore, the UE may be paged using the at least one beam that the UE is actively using for communication with the base station.

In inactive and idle states, however, the location of the UE may be unknown at the beam level. Consequently, the UE may be paged in a wider area, because the beam(s) that the UE may use for communication may be unknown. When the UE is in an idle state, for example, the UE may be paged using the UE Registration Area. Thus, a paging message for the UE may be transmitted across all of the set of TAIs included in the UE Registration Area. When the UE is in an inactive state, however, the UE may be paged using a RAN Notification Area. Thus, a paging message for the UE may be transmitted across all of the one or more TAIs, RAIs, and/or cell IDs included in the RAN Notification Area assigned to the UE.

Such approaches to paging may be suitable for UEs that are mobile, such as UEs that frequently or occasionally move to different RAN areas and/or tracking areas. However, some UEs may be considered to be "reduced capability," and at least some reduced capability UEs may be considered to be stationary, e.g., in that those UEs are located at a fixed position. While some reduced capability UEs may move, such as by rotating or otherwise changing orientation, those UEs may remain otherwise stationary.

Examples of such reduced capability UEs include industrial wireless sensors, surveillance devices, smart meters, various Internet-of-Things (IoT) devices (e.g., industrial IoT (IIoT) devices), and the like.

As some UEs having reduced capability may remain stationary or may be low mobility, communication between those UEs and base stations (e.g., gNB) may use relatively few beams, e.g., compared to the number of available beams, such as 128 available beams. As these reduced capability UEs may use few beams and are unlikely to travel outside of a localized area covered by relatively few base stations (e.g., five or ten), paging these UEs on a RAN Notification Area and/or UE Registration Area may cause unnecessary overhead and unnecessarily waste resources. For example, paging a reduced capability UE using 128 beams in a cell when that reduced capability UE only uses two or four beams may be wasteful in terms of time, resource consumption, processing power, and so forth. However, the reduced capability UEs may still operate in inactive and/or idle states at various times and, therefore, paging at a beam level may not be possible because those UEs are not in a connected and/or in an active state in which the beam used for communication with the UE is known. Accordingly, a need exists to reduce the overhead incurred by paging UEs when those UEs are in inactive and/or idle states, such as UEs having reduced capabilities, low mobility, and/or are stationary.

The present disclosure provides various techniques and solutions to paging reduced capability, low mobility, and/or stationary UEs that are operating in inactive and/or idle states. In particular, the present disclosure describes various approaches to paging UEs in inactive and/or idle states at higher levels of granularity, e.g., such as a beam level of granularity rather than a tracking area level. However, one of ordinary skill in the relevant art will readily appreciate the applications and potential benefits to some systems and devices not operating or incapable of operating in an inactive state or an idle state.

In one aspect of the disclosure, a first method, a first computer-readable medium, and a first apparatus are provided. The first apparatus may be a UE or a component thereof. The first apparatus may be configured to receive, from a network, a message configuring at least one beam notification area associated with positioning of the UE. The at least one beam notification area may include a set of beams corresponding to a set of cells identified by the network as candidates for carrying a paging message for the UE in the at least one beam notification area. The apparatus may be further configured to receive the paging message from the network via one of the set of beams corresponding to one of the set of cells in which the UE is positioned based on the at least one beam notification area. In some aspects, an RRC layer of a protocol stack of the UE is in an idle state or an inactive state when receiving the paging message.

In another aspect of the disclosure, a second method, a second computer-readable medium, and a second apparatus are provided. The second apparatus may be a base station or a component thereof, which may operate a cell. The second apparatus may be configured to transmit, to a UE, a message configuring at least one beam notification area associated with positioning of the UE. The at least one beam notification area may include a set of beams corresponding to a set of cells identified as candidates for carrying a paging message for the UE in the at least one beam notification area. The second apparatus may be further configured to transmit the paging message to the UE via one of the set of beams corresponding to one of the set of cells in which the UE is positioned based on the at least one beam notification area. In some aspects, an RRC layer of a protocol stack of the UE is in an idle state or an inactive state when receiving the paging message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
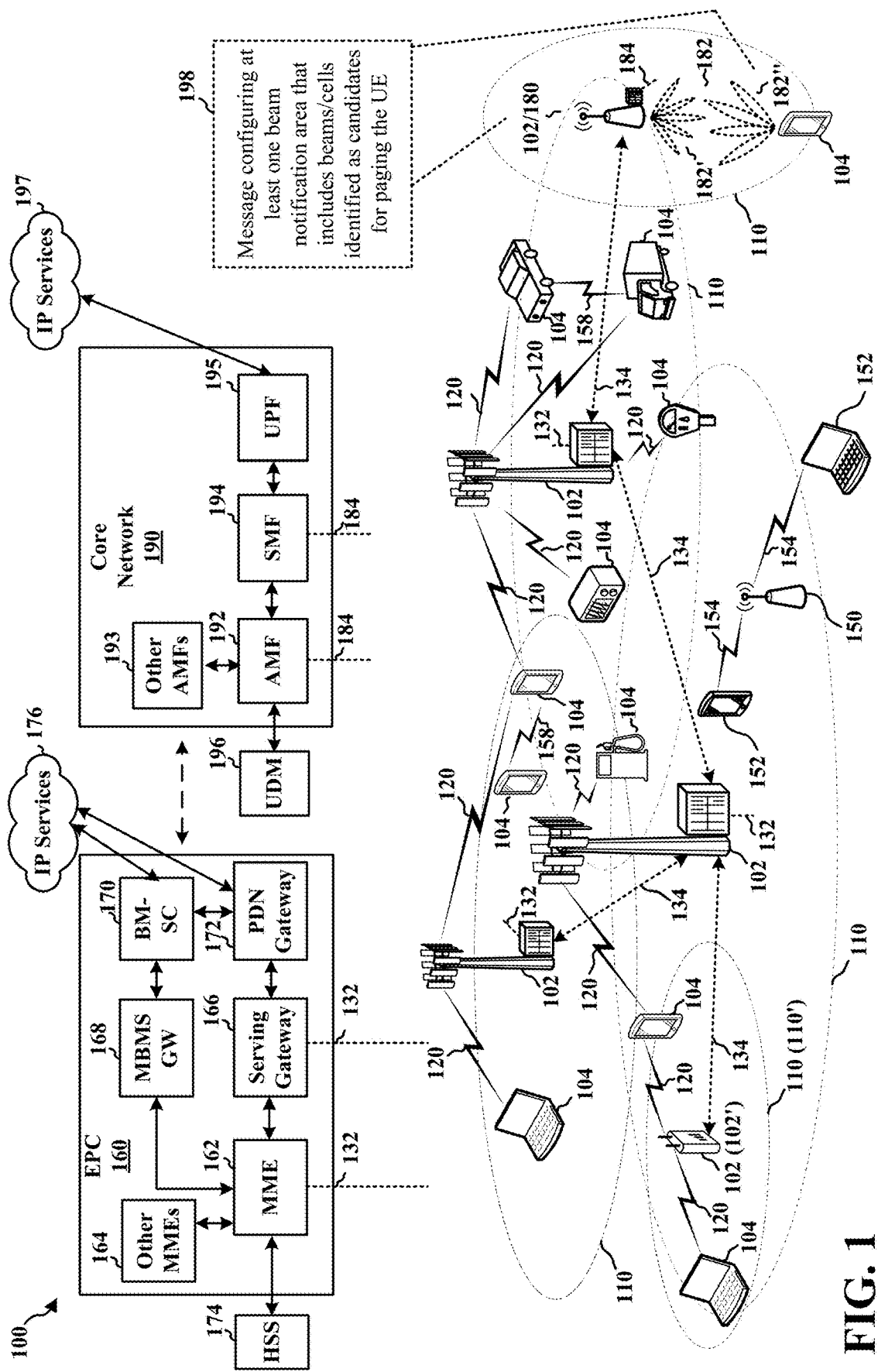
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more aspects of the present disclosure, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive, from a network that includes the base station 102/180, a message configuring at least one beam notification area associated with positioning of the UE (198). The at least one beam notification area may include a set of beams corresponding to a set of cells identified by the network as candidates for carrying a paging message for the UE 104 in the at least one beam notification area. The UE 104 may be further configured to receive the paging message from the network (e.g., the base station 102/180) via one of the set of beams corresponding to one of the set of cells in which the UE 104 is positioned based on the at least one beam notification area. In some aspects, an RRC layer of a protocol stack of the UE 104 is in an idle state or an inactive state when receiving the paging message.

Correspondingly, the base station 102/180 (or another network entity of the access network) may be configured to transmit, to the UE 104, the message configuring at least one beam notification area associated with positioning of the UE 104 (198). Again, the at least one beam notification area may include a set of beams corresponding to a set of cells identified as candidates for carrying a paging message for the UE 104 in the at least one beam notification area. The base station 102/180 (or another base station) may be further configured to transmit the paging message to the UE 104 via one of the set of beams corresponding to one of the set of cells in which the UE 104 is positioned based on the at least one beam notification area. In some aspects, an RRC layer of a protocol stack of the UE 104 is in an idle state or an inactive state when receiving the paging message.

Further aspects and details related to UE paging by a network with high levels of granularity (e.g., beam-level paging) are provided herein. Some of these aspects and details may be implemented when an RRC layer of a UE is in an idle state or an inactive state.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100× is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (ID) (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
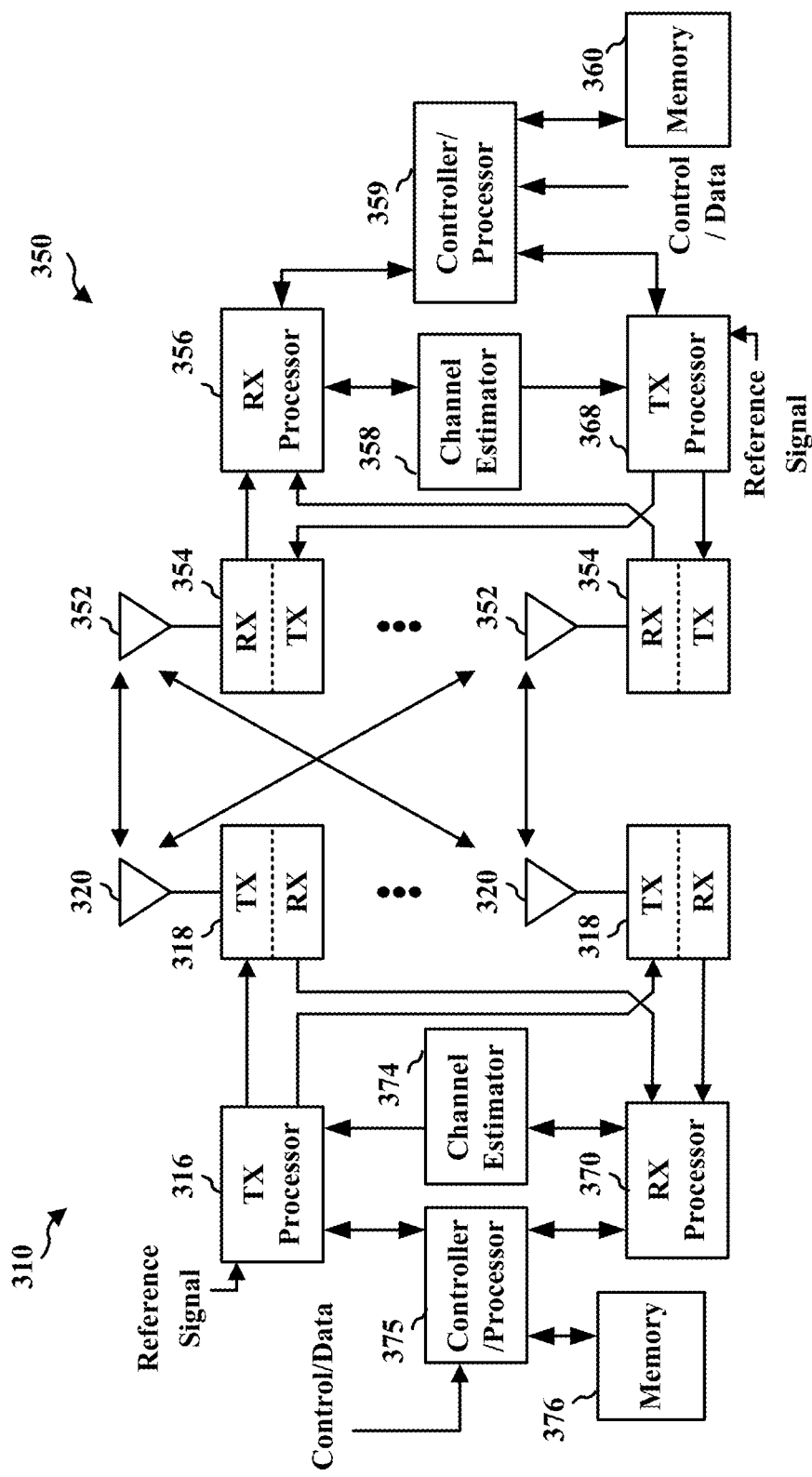
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with (198) of FIG. 1.

In some other aspects, at least one of the TX processor 316, the RX processor 370, and the controller/processor 375 may be configured to perform aspects in connection with (198) of FIG. 1.

In various RANs, such as a 5G NR network, communication with some UEs may be initiated by paging. In order to establish where a UE is to be paged, the UE may register with the network so that the UE's position is known and the UE can be paged in the appropriate area. In particular, the UE may be tracked at the level of a core network and/or the level of a RAN.

At the level of the core network, a UE may perform a tracking area registration procedure, according to which the UE may be assigned a UE Registration Area. The UE Registration Area may be associated with a set of tracking area identifiers (TAIs). Each TAI may be associated with one or more RAN areas, e.g., so that the UE may be tracked at the RAN level. Each RAN area may be identified by a corresponding RAN area identifier (RAI). An RAI may indicate a set of cells in which the UE may be located. In addition, the UE may be assigned a RAN Notification Area, which may include a set of RAIs, TAIs, and/or cell IDs in which the UE may be located.

When the UE moves to a new cell that is not included in the assigned RAN Notification Area, the UE may perform a procedure for updating the RAN notification area that corresponds to the position of the UE, which may include the exchange of one or more RRC messages indicating that the UE is performing a RAN Notification Area Update procedure with the network. In response, the network may assign the UE a new RAN Notification Area, which may include the new cell to which the UE moved. Similarly, when the UE moves to the new cell and the new cell is not included in the UE Registration Area assigned to the UE, the UE may perform a NAS Registration Update procedure with the network. For the NAS Registration Update, the network may assign the UE a new UE Registration Area, which may indicate a set of TAIs that includes the new cell.

When the UE is operating in an active and/or connected state, the UE may be actively connected with the network and, therefore, the network may know where the UE is located not only at the core network and RAN levels, but also at a beam level—e.g., as the UE may be actively connected with a base station and using at least one active beam to communicate with the base station. Therefore, the UE may be paged using the at least one beam that the UE is actively using for communication with the base station.

In inactive and idle states, however, the location of the UE may be unknown at the beam level. Consequently, the UE may be paged in a wider area, because the beam(s) that the UE may use for communication may be unknown. When the UE is in an idle state, for example, the UE may be paged using the UE Registration Area. Thus, a paging message for the UE may be transmitted across all of the set of TAIs included in the UE Registration Area. When the UE is in an inactive state, however, the UE may be paged using a RAN Notification Area. Thus, a paging message for the UE may be transmitted across all of the one or more TAIs, RAIs, and/or cell IDs included in the RAN Notification Area assigned to the UE.

Such approaches to paging may be suitable for UEs that are high mobility, which may frequently move to different RAN areas and/or tracking areas. However, some UEs may be classified as low mobility, or even medium mobility, and therefore, are less likely to move between RAN or tracking areas with the frequency of UEs classed as high mobility. Other UEs may be stationary for extended periods of time, at least in terms of geographic location. In addition, some UEs, such as some stationary or low mobility UEs, may be considered to be "reduced capability," e.g., due to having relatively few antenna elements. While some reduced capability UEs may move, such as by rotating, tilting, or otherwise changing orientation, those UEs may remain otherwise stationary or within a zone having a radius of less than a kilometer (km). Examples of such reduced capability UEs include industrial wireless sensors, surveillance devices, smart meters, various Internet-of-Things (IoT) devices (e.g., industrial IoT (IIoT) devices), and the like.

For those UEs classed as reduced capability, or not classed as high mobility, communication with a base station (e.g., gNB) may generally occur via relatively few beams, e.g., compared to the number of available beams, such as 128 available beams. As communication with these UEs may use a relatively small number of the same beams, paging these UEs on a granularity level of a RAN Notification Area and/or UE Registration Area may cause unnecessary overhead and waste resources. For example, paging a reduced capability UE via 128 beams in a cell when that reduced capability UE is only available via the same two or four beams may be wasteful in terms of time, resource consumption, etc. However, the reduced capability UEs may still operate in inactive and/or idle states at various times and, therefore, paging at a beam level may not be possible because those UEs are not in a connected and/or active state in which the beam used for communication with the UE is known. Accordingly, a need exists to reduce the overhead incurred by paging reduced capability and/or stationary UEs when those UEs are in inactive and/or idle states.

With reference to FIGS. 4 through 9, various techniques and solutions are provided for paging reduced capability and/or stationary UEs that are operating in inactive and/or idle states. In particular, FIGS. 4 through 9 describe various approaches to paging UEs in inactive and/or idle states at high levels of a granularity, such as a beam level of granularity, e.g., as opposed to a tracking area level of granularity.

Figure 4:
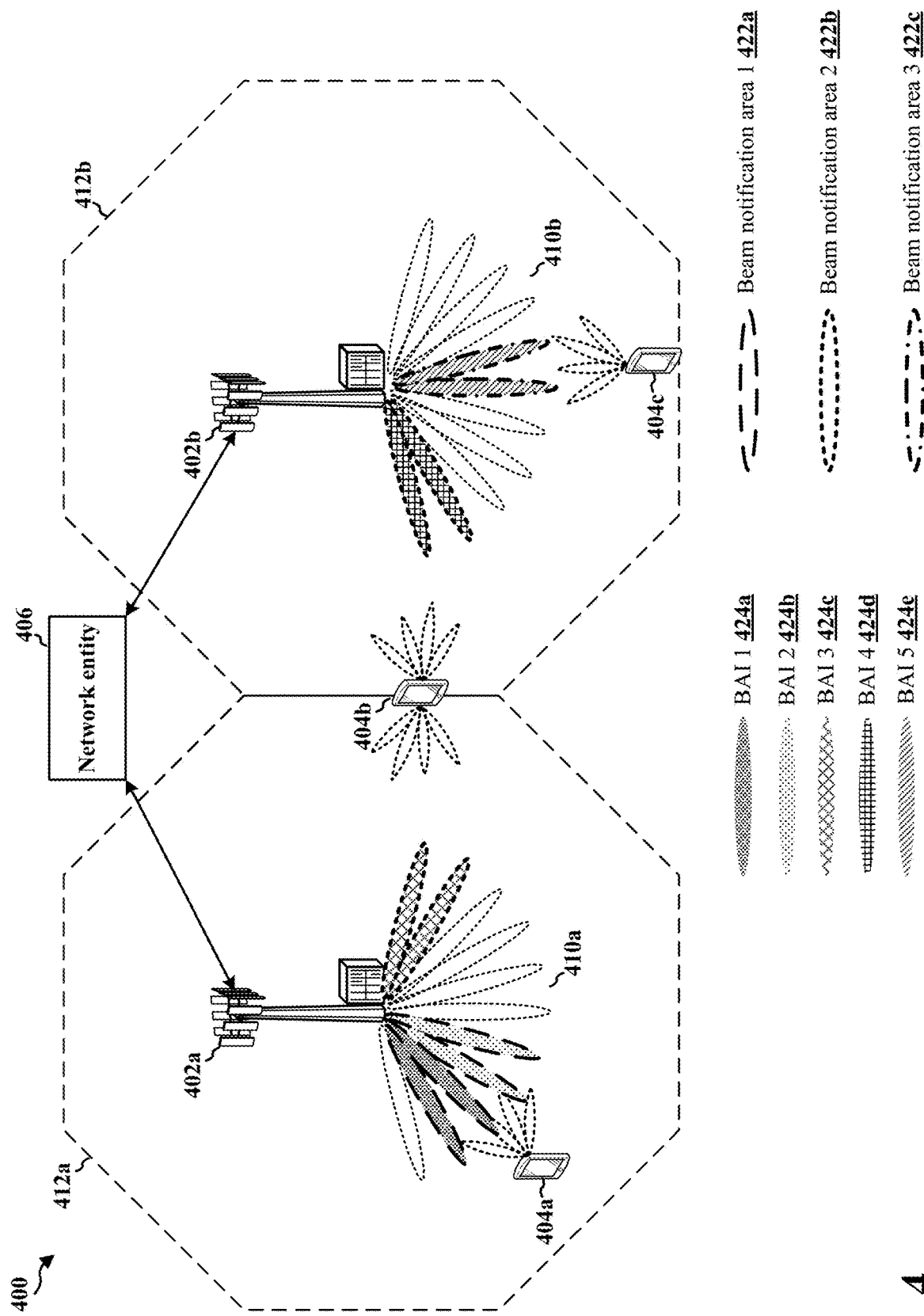
FIG. 4 is a diagram illustrating an example of beam notification areas in which UEs may be paged when in an idle state or an inactive state.

FIG. 4 is a diagram illustrating an example of a wireless communication environment and access network 400 having beam notification areas 422a-c in which UEs 404a-c may be paged when in an idle state or an inactive state. The access network 400 may include a set of base station 402a-b connected with a network entity 406. In some aspects, the network entity 406 may be colocated with at least one of the base station 402a-b and/or may be part of the access network 400. In some other aspects, the network entity 406 may be part of an EPC (e.g., the EPC 160 of FIG. 1) and/or part of a core network (e.g., the core network 190 of FIG. 1).

In the access network 400, a plurality of UEs 404a-c may operate on cells 412a-b respectively provided by the base stations 402a-b. In some aspects, each of the plurality of UEs 404a-c may be a reduced capability UE, a stationary UE, and/or a low mobility UE. When data arrives at one of the base stations 402a-b to be transmitted to one of the UEs 404a-c, the one of the base stations 402a-b may page the one of the UEs 404a-c. Potentially, an RRC layer of a protocol stack of one of the UEs 404a-c may be in an idle state or inactive state when the one of the UEs 404a-c is to be paged.

Each of the UEs 404a-c communicate with at least one of the base stations 402a-b using directional beamforming. When one of the base stations 402a-b needs to page one of the UEs 404a-c, the base station may transmit a paging message via at least one beam of a respective set of the beams 410a-b. Correspondingly, the one of the UEs 404a-c may receive the paging message (or other signaling) via the at least one beam of the respective set of the beams 410a-b.

A beam may refer to directional tuning of transceiver circuitry for transmitting or receiving some signaling. In some aspects, transceiver circuitry may be directionally tuned using one or more functions that effectively tune towards a pilot signal, such as an SS/PBCH block or CSI-RS. The one or more functions may consider various factors, including Doppler shift, Doppler spread, average delay, delay spread, or another spatial parameter. In some aspects, a spatial filter may be based on such one or more functions, and the spatial filter may be applied for beamforming in a direction of interest.

Each of the first set of beams 410a of the first base station 402a and the second set of beams 410b generated by the second base station 402b may correspond with an ID, e.g., so that the UEs 404a-c and the base station 402a-b are able to identify and refer to the directional beams used for communication. For example, each of the first set of beams 410a may be associated with a respective SSB transmitted thereon by the first base station 402a and/or each of the first set of beams 410a may be associated with a respective CSI-RS transmitted thereon by the first base station 402a. Similarly, each of the second set of beams 410b may be associated with a respective SSB transmitted thereon by the second base station 402b and/or each of the second set of beams 410b may be associated with a respective CSI-RS transmitted thereon by the second base station 402b.

In order to locate each of the UEs 404a-c at a beam level of granularity for paging, each of the UEs 404a-c may be associated with a respective one of the beam notification areas 422a-c. Each of the beam notification areas 422a-c may include a set of one or more beam area identifiers (BAIs) 424a-e. A BAI may include one or more combinations of one or more beams and a cell (e.g., cell ID). A respective one of the UEs 404a-c may be able to be paged on at least one of the combinations of one or more beams and a cell included in a corresponding one of the BAIs 424a-e.

For example, the first UE 404a may be assigned a first beam notification area 422a. The first beam notification area 422a may include two BAIs 424a-b. The first BAI 424a may include a combination of two of the beams 410a and the cell 412a (e.g., cell ID) provided by the first base station 402a generating the two beams of the beams 410a. The second BAI 424b may include a combination of two different beams of the beams 410a and the cell 412a provided by the first base station 402a.

The first UE 404a may use those four beams of the beams 410a in the first cell 412a, e.g., because the first UE 404a may be stationary. Accordingly, the first UE 404a may be able to be paged using the beams of the first cell 412a included in the first and second BAIs 424*a-b*, even when the first UE 404*a* is in an idle state or an inactive state and is not connected and/or in an active state with the first base station 402*a* such that the first UE 404*a* is known at the beam level.

Therefore, when a page comes through (e.g., from the network entity 406) for the first UE 404*a*, the first UE 404*a* may be paged using the first beam notification area 422*a* assigned to the first UE 404*a*, even though the first UE 404*a* may be in an inactive state or an idle state. The first base station 402*a* may transmit the page on each of the beams included in the first and second BAIs 424*a-b* of the beam notification area 422*a* assigned to the first UE 404*a*.

Similarly, the third UE 404*c* may be assigned a third beam notification area 422*c*. However, the third beam notification area 422*c* may include one BAI 424*e*. The fifth BAI 424*e* may include a combination of two of the beams 410*a* and the cell 412*b* (e.g., cell ID) provided by the second base station 402*b* generating the two beams of the beams 410*b*. Potentially, the third UE 404*c* may be low mobility, stationary, and/or may include a relatively few number of antenna elements, and therefore, the third UE 404*c* may only use two of the beams 410*b* to communicate with the second base station 402*b*. Thus, the third beam notification area 422*c* may only include a single BAI, as a combination of only a few beams and one cell may be used to page the third UE 404*c*.

When a page comes through (e.g., from the network entity 406) for the third UE 404*c*, the third UE 404*c* may be paged using the third beam notification area 422*c* assigned to the third UE 404*c*, even though the third UE 404*c* may be in an inactive state or an idle state. The second base station 402*b* may transmit the page on each of the beams included in the fifth BAIs 424*e* of the beam notification area 422*c* assigned to the third UE 404*c*.

In some aspects, the second UE 404*b* may be on a cell edge and/or may be rotating such that the second UE 404*b* is able to communicate in both the first and second cells 412*a-b*. As each BAI may include not just beams on which a UE can be paged, but also a cell corresponding to the beams, the second UE 404*b* may be assigned a beam notification area 422*b* having BAIs that include both the first and second cells 412*a-b*. That is, the second UE 404*b* may be assigned a beam notification area 422*b* that includes a third BAI 424*c* that includes a combination of two of the beams 410*a* and the cell 412*a* (e.g., cell ID) provided by the first base station 402*a* generating the two beams of the beams 410*a*, and also includes a fourth BAI 424*d* that includes a combination of two different beams of the beams 410*b* and the cell 412*b* provided by the second base station 402*b* generating those two of the beams 410*b*. By assigning UEs beam notification areas that include multiple BAIs, a ping-pong effect may be avoided when a UE is paged at a beam level in an inactive or idle state.

When a page comes through (e.g., from the network entity 406) for the second UE 404*b*, the second UE 404*b* may be paged using the second beam notification area 422*b* assigned to the second UE 404*b*, even though the second UE 404*b* may be in an inactive state or an idle state. However, the page may go through both the first and second cells 412*a-b*, as the second UE 404*b* is assigned a beam notification area 422*b* that includes two different cells. Accordingly, the first base station 402*a* may transmit the page on each of the beams included in the third BAI 424*c* of the beam notification area 422*b* assigned to the second UE 404*b* and, contemporaneously, the second base station 402*b* may transmit the page on each of the beams included in the fourth BAI 424*d* of the beam notification area 422*b* assigned to the second UE 404*b*.

Figure 5:
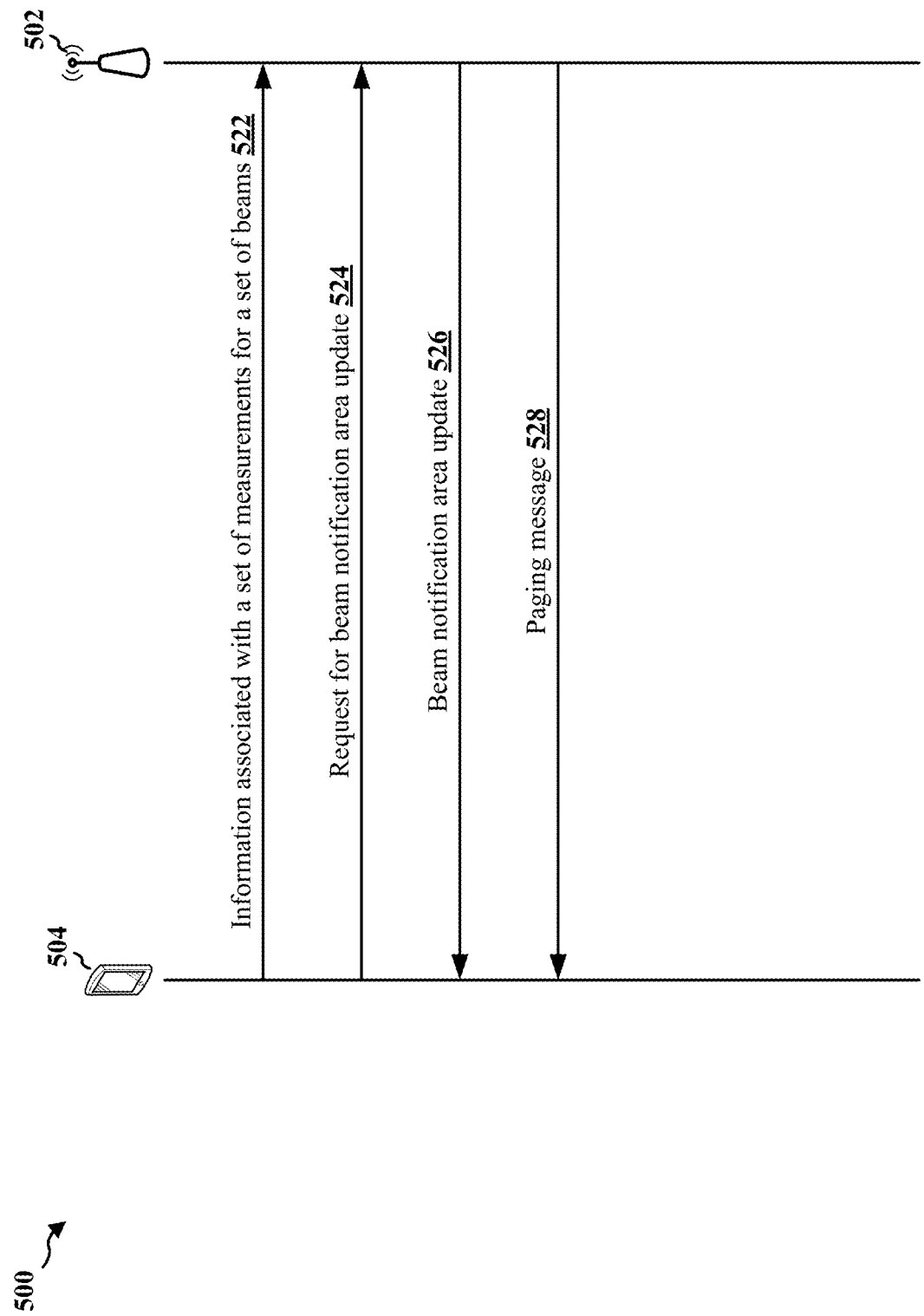
FIG. 5 is a call flow diagram illustrating example operations and communications for paging a UE in a beam notification area.

FIG. 5 is a call flow diagram illustrating example operations 500 for paging a UE 504 in a beam notification area. A wireless environment and access network 502 may include multiple base stations with UEs connected thereto, such as the UE 504. The network 502 (e.g., a base station of the network 502) may be configured to page a reduced capability UE in an inactive state or an idle state at a beam level of granularity.

In various aspects, the UE 504 may transmit, to the network (e.g., a base station, gNB, etc.), measurement information 522 associated with a set of measurements for a set of beams. For example, the UE 504 may perform measurements on one or more beams used to communicate with one or more base stations of the network 502. The measurements may include reference signal receive power (RSRP) values, signal-to-noise (SNR) values, or other values (e.g., L1 values). The information 522 may indicate one or more IDs corresponding to one or more beams used by the UE 504 to communicate with one or more base stations of the network. In some aspects, the information 522 may request or recommend a set of beams on which the UE 504 is to be paged when the UE 504 is in an idle state and/or an inactive state.

Further, the UE 504 may transmit a request 524 for a beam notification area update to the network 502. For example, the UE 504 may determine that a current beam associated with a current cell used for communication is absent from each of a set of BAIs included in a beam notification area assigned to the UE 504. Therefore, the UE 504 may determine that a beam notification area update procedure should be performed so that the UE 504 is assigned a beam notification area with BAIs including beams on which the UE 504 can be paged.

In some aspects, the UE 504 may transmit the request 524 on a set of preconfigured resources. The UE 504 may transmit the request 524 as an RRC message or as a message on a random access (RA) channel (RACH). For example, the UE 504 may transmit the request 524 on PUSCH and/or PUCCH resources corresponding to a msg3 of a four-step RACH procedure or the UE 504 may transmit the request 524 on PUSCH and/or PUCCH resources of a msgA of a two-step RACH procedure. In some aspects, the request 524 may explicitly request the beam notification area update. In some other aspects, the request 524 may implicitly request the beam notification area update. For example, the request 524 may be indicated through a RACH message that is transmitted by the UE 504 on a preconfigured RACH occasion that corresponds to a request for a beam notification area update. In some aspects, the UE 504 may transmit the measurement information 522 and the request 524 in a same message.

The network 502 may receive the measurement information 522 and the request 524 and, based on at least one, the network 502 may determine a beam notification area for the UE 504. For example, the network 502 may determine the beams on which the UE 504 can be reached based on the measurements (e.g., L1 measurements) received from the UE 504 for beams in one or more cells in which the UE 504 operates and/or based on the beams requested/recommended by the UE 504.

In determining the beam notification area for the UE 504, the network 502 may determine one or more BAIs. The one or more BAIs may include one or more combinations of one or more beams and a cell of those one or more beams. Each of the combinations may be estimated by the network 502 to potentially be used to page the UE 504. The network 502 may then transmit the beam notification area update 526 to the UE 504 to indicate those BAIs to the UE 504 that are to be used to page the UE 504 when the UE 504 is in an idle state or an inactive state. The network 502 may transmit the beam notification area update 526 in at least one of an RRC signaling message, DCI, and/or a MAC control element (CE).

The UE 504 may receive the beam notification area update 526. The UE 504 may determine the beam and cell combinations that the UE 504 is to monitor when the UE 504 is in an idle state or an inactive state based on the BAIs included in the beam notification area update 526.

Subsequently, when a paging message 528 comes through for the UE 504, the network 502 may transmit the paging message 528 to the UE 504 based on the beam notification area update 526 assigned to the UE 504. Specifically, each of the cells included in each of the BAIs of the beam notification area update 526 may transmit the paging message 528 to the UE 504 using each of the beams included in the BAIs.

When the UE 504 is in an inactive state or an idle state, the UE 504 may receive the paging message 528 based on the assigned beam notification area update 526, as the UE 504 may be monitoring the beam and cell combinations included in the BAIs of the assigned beam notification area update 526.

Figure 6:
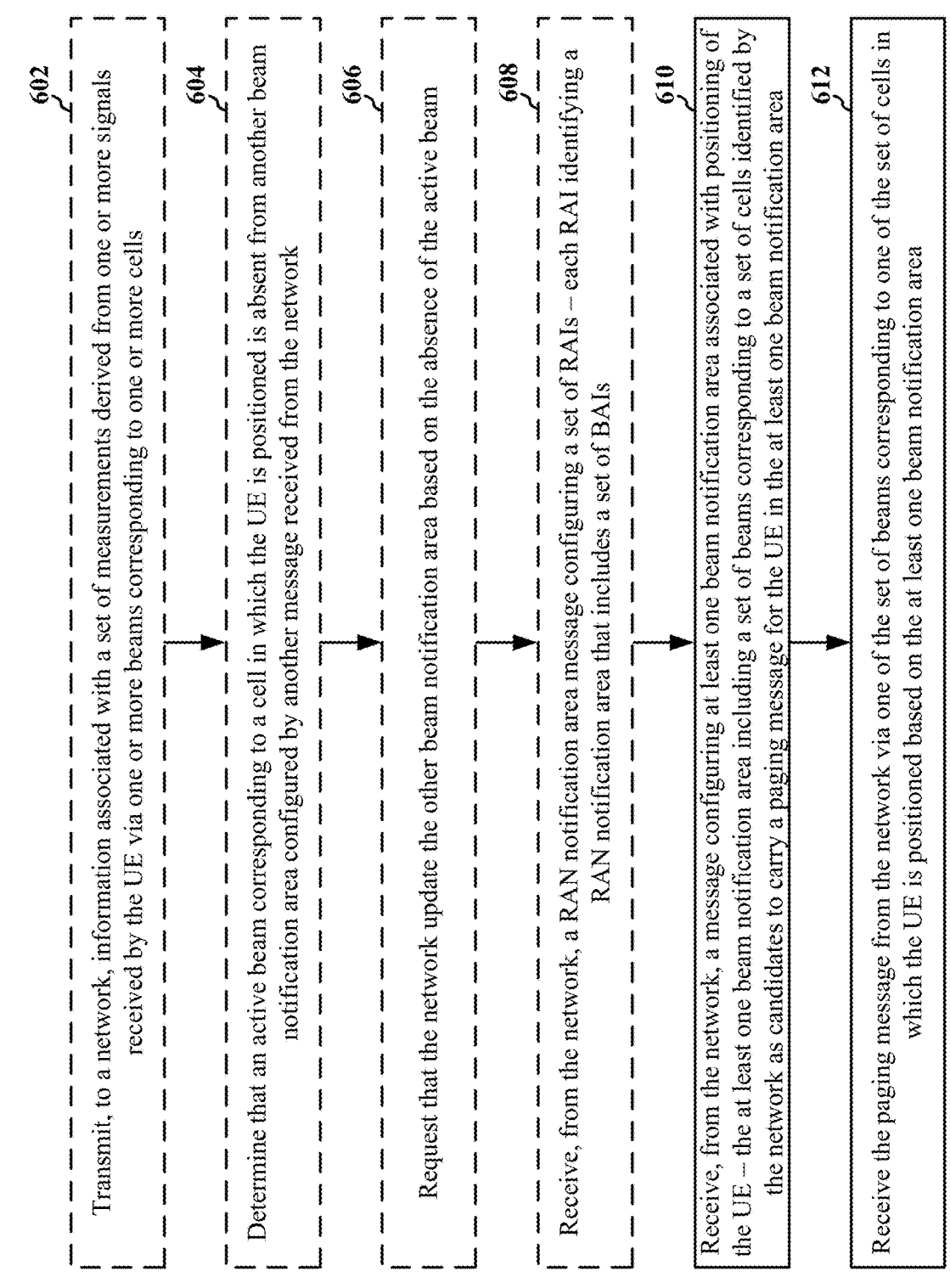
FIG. 6 is a flowchart of an example method of wireless communication by a UE.

FIG. 6 is a flowchart of a method 600 of wireless communication. The method 600 may be performed by a UE (e.g., the UE 104, 350, 404a-c, 504) and/or other apparatus (e.g., the apparatus 802). According to various different aspects of the method 600, one or more of the illustrated operations may be omitted, transposed, or contemporaneously performed.

At 602, the UE may transmit, to a network, information associated with a set of measurements derived from one or more signals received by the UE via one or more beams corresponding to one or more cells. In some aspects, the information associated with the set of measurements may include at least one of a set of L1 measurements derived from the one or more signals received by the UE via the one or more beams, or a set of values that identifies the one or more beams. The information associated with the set of measurements may indicate a request to include the one or more beams corresponding to the one or more cells in a beam notification area.

In the context of FIG. 4, the first UE 404a may transmit, to the first base station 402a, information associated with a set of measurements derived from one or more signals received by the first UE 404a via one or more of the beams 410a. In the context of FIG. 5, the UE 504 may transmit the measurement information 522 to the network 502.

At 604, the UE may determine that an active beam corresponding to a serving cell is absent from another beam notification area configured by another message received from the network. In some aspects, the UE may identify at least one of a transmit beam of the base station and a receive beam of the UE via which the UE is communicating data and/or control information with the base station. Each of the two beams of which the beam pair is composed may be regarded as an "active" beam, e.g., unless a radio link failure occurs or is intentionally closed. Each active beam may be associated with an ID, such as a value carried by pilot signals transmitted via the active beam, and/or other identifying information, such as information related to a spatial filter or other parameters/characteristics that may be used alone or in an aggregate form to uniquely distinguish one beam from other beams at the base station or at the UE.

In the context of FIG. 4, if the first UE 404a is communicating with the first base station 402a via at least one of the beams of the first BAI 424a, then the first UE 404a may determine that at least one of the beams of the first BAI 424a is absent from the first beam notification area 422a if the first UE 404a does not receive a beam notification area update that includes the at least one of the beams of the first BAI 424a in a beam notification area, such as the first beam notification area 422a. In the context of FIG. 5, the UE 504 may determine that that an active beam corresponding to a serving cell is absent from another beam notification area configured by another message received from the network one or more current beams associated with one or more current cells of the network 502 used by the UE 504 for communication with the network 502 are absent from a previous set of BAIs.

At 606, the UE may request that the network update the other beam notification area based on the absence from the other beam notification area of the active beam corresponding to the serving cell. According to various aspects, the request may be one of an explicit request or an implicit request, and may be transmitted in one of an RRC signaling message or a RACH message on a set of resources, which may be configured (or preconfigured) to indicate the request to update the other notification beam area. In the context of FIG. 4, the first UE 404a may request that the network update the other beam notification area based on the absence from the other beam notification area of the active beam corresponding to the serving cell. In the context of FIG. 5, the UE 504 may transmit the request 524 to the network 502 to request the network to update a beam notification area assigned to the UE 504.

In some aspects, requesting that the network update the at least one beam notification area includes (1) generating an RRC message with at least one field including information explicitly requesting that the network update the other beam notification area, and (2) transmitting the RRC message to the network. In some other aspects, requesting that the network update the at least one beam notification area includes (1) selecting a set of resources on a RACH that are configured to implicitly request the network to update the at least one beam notification area, (2) mapping an RA message to the selected set of RACH resources, and (3) transmitting the mapped RA message to the network on the selected set of RACH resources.

At 608, the UE may receive, from the network, a RAN notification area message configuring a set of RAIs. Each RAI may identify a RAN notification area that includes a set of BAIs. For example, each of the RAIs may indicate a set of cells in which the UE may be positioned—e.g., the UE is estimated to be camped on one of the cells included in a RAN notification area at any given time. In some aspects, the UE may receive a RAN notification area update that configures a set of RAIs in response to transmitting a RAN notification area update request. In some aspects, the RAN notification update request may be included in or indicated by the aforementioned request to update the other beam notification area. In other aspects, the RAN notification update request may be separate from the aforementioned request to update the other beam notification area.

In the context of FIG. 4, the first UE 404a may receive, from the first base station 402a, a RAN notification area message indicating the first UE 404a is estimated to be in a RAN notification area that includes the first and second cells 410a-b. In the context of FIG. 5, the UE 504 may transmit the request 524 (or a separate request) to the network 502, which may indicate a request the network 502 to update a RAN notification area assigned to the UE 504.

At 610, the UE receives, from the network, a message configuring at least one beam notification area associated with positioning of the UE. The at least one beam notification area may include a set of beams corresponding to a set of cells identified by the network as candidates for carrying a paging message for the UE in the at least one beam notification area. For example, the message configuring the at least one beam notification area may include at least one BAI identifying the at least one beam notification area having the set of beams corresponding to the set of cells. The beam notification area update may be received in one of an RRC signaling message, DCI and/or MAC CE. Each of the one or more beams may correspond to a respective SSB and/or CSI-RS. For example, the message may be based on the information associated with the set of measurements derived from the set of signals received via one or more of the set of beams.

In the context of FIG. 4, the first UE 404a may receive, from the first base station 402a, a message configuring the first beam notification area 422a associated with positioning of the first UE 404a, with the first beam notification area 422a including a subset of the beams 410a that correspond to the first and second BAIs 424a-b, which may be candidates for carrying a paging message to the first UE 404a. In the context of FIG. 5, the UE 504 may receive, from the network 502, the beam notification area update 526.

At 612, the UE receives the paging message from the network via one of the set of beams corresponding to one of the set of cells in which the UE is positioned based on the at least one beam notification area. In some aspects, an RRC protocol layer of the UE may be in an idle state or an inactive state when the UE receives the paging message. In the context of FIG. 4, the first UE 404a may receive a paging message from the first base station 402a via one of the subset of the beams 410a that correspond to the first and second BAIs 424a-b based on the first beam notification area 422a. In the context of FIG. 5, the UE 504 may receive the paging message 528 from the network 502 based on the beam notification area update 526.

Figure 7:
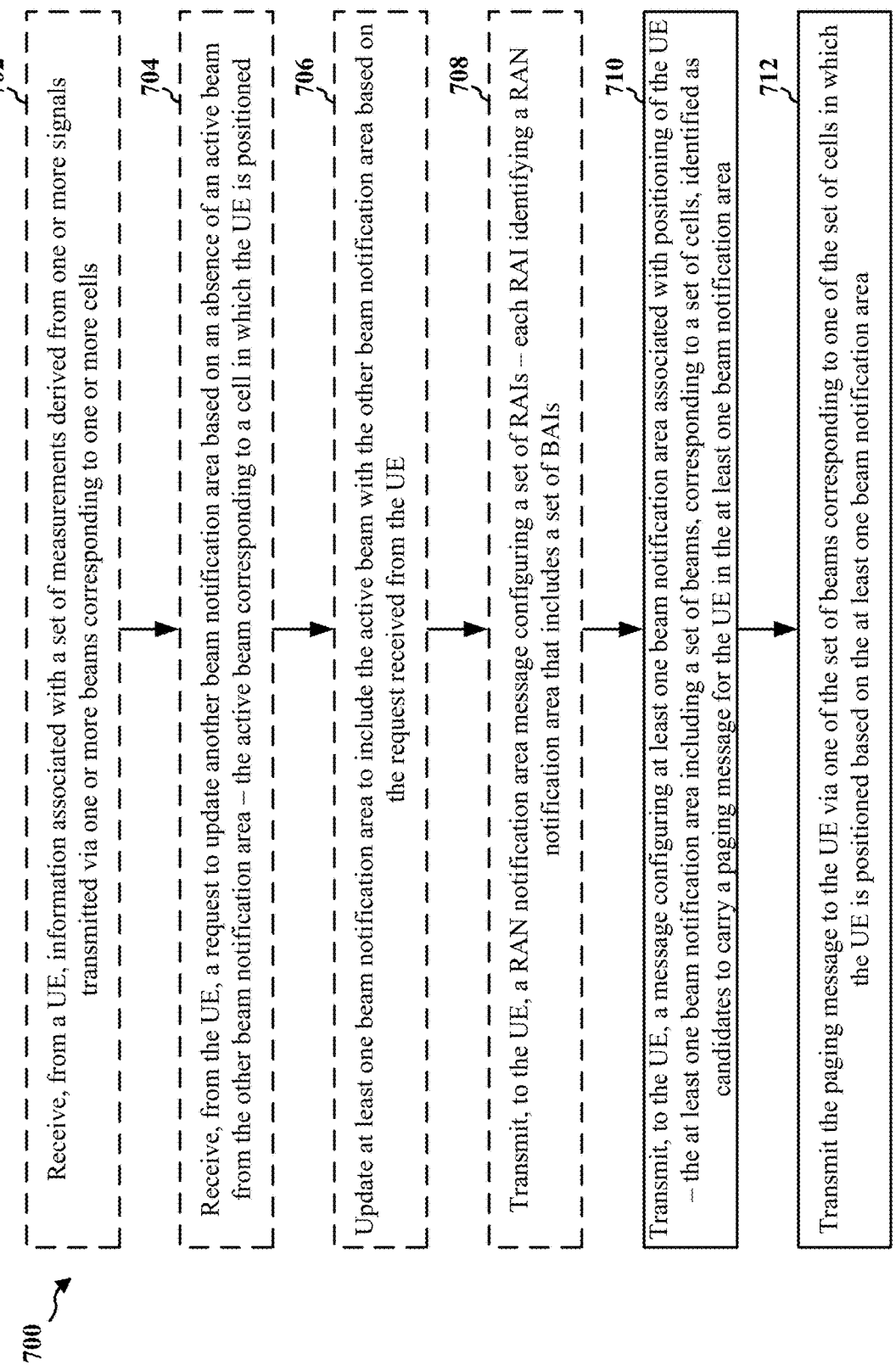
FIG. 7 is a flowchart of an example method of wireless communication by a base station.

FIG. 7 is a flowchart of a method 700 of wireless communication. The method 700 may be performed by a base station (e.g., a base station 102/180, 310, 402a, 402b, and/or a base station of the network 502), a network entity (e.g., the network entity 406 or another entity of the network 502) and/or other function or apparatus (e.g., the apparatus 902). For clarity, the method 700 is described as being implemented at a base station; however, it should be appreciated that the method 700 may be practiced in any of the aforementioned systems or devices. According to various aspects of the method 700, one or more of the illustrated operations may be omitted, transposed, or contemporaneously performed.

At 702, the base station may receive, from a UE, information associated with a set of measurements derived from one or more signals transmitted via one or more beams corresponding to one or more cells. In some aspects, the information associated with the set of measurements may include at least one of a set of L1 measurements derived from one or more signals received by the UE via the one or more beams, or a set of values that identifies the one or more beams. The information associated with the set of measurements may indicate a request to include the one or more beams corresponding to the one or more cells in a beam notification area.

In the context of FIG. 4, the first base station 402a may receive, from the first UE 404a, information associated with a set of measurements derived from one or more signals received by the first UE 404a via one or more of the beams 410a. In the context of FIG. 5, the network 502 may receive the measurement information 522 from the UE 504.

At 704, the base station may receive, from the UE, a request to update another beam notification area based on an absence of an active beam from the other beam notification area. The active beam may correspond to a serving cell in which the UE is positioned. According to various aspects, the request may be one of an explicit request or an implicit request, and may be received in one of an RRC signaling message or a RACH message on a set of resources, which may be configured (or preconfigured) to indicate the request to update the other notification beam area.

In the context of FIG. 4, the first base station 402a may transmit UE 404a may request that the network update the other beam notification area based on the absence from the other beam notification area of the active beam corresponding to the serving cell. In the context of FIG. 5, the network 502 may receive the request 524 from the UE 504.

In some aspects, receiving the request to update another beam notification area includes receiving, from the UE, an RRC message with at least one field including information explicitly requesting to update the other beam notification area. In some other aspects, receiving the request to update another beam notification area includes receiving an RA message from the UE on a set of resources of a RACH, with the set of resources of the RACH carrying the RA message being an implicit request to update the other beam notification area.

At 706, the base station may update at least one beam notification area to include the active beam with the other beam notification area based on the request received from the UE. For example, first, the base station may associate the active beam with the UE, such as by storing information indicating an association therebetween. Second, the base station may reconfigure the beam notification area for the UE to include a BAI that includes the active beam. In the context of FIG. 4, the first base station 402a may update the first beam notification area 422a to include the first BAI 424a where the first BAI 424a was previously absent from the first beam notification area 422a. In the context of FIG. 5, the network 502 may update a beam notification area assigned to the UE 504.

At 708, the base station may transmit, to the UE, a RAN notification area message configuring a set of RAIs. Each RAI may identify a RAN notification area that includes a set of BAIs. For example, each of the RAIs may indicate a set of cells in which the UE may be positioned—e.g., the UE is estimated to be camped on one of the cells included in a RAN notification area at any given time. In some aspects, the base station may transmit a RAN notification area update that configures a set of RAIs in response to receiving a RAN notification area update request from the UE. In some aspects, the RAN notification update request may be included in or indicated by the aforementioned request to update the other beam notification area. In other aspects, the RAN notification update request may be separate from the aforementioned request to update the other beam notification area.

In the context of FIG. 4, the first base station 402a, may transmit, to the first UE 404a, a RAN notification area message indicating the first UE 404a is estimated to be in a RAN notification area that includes the first and second cells 410a-b. In the context of FIG. 5, the network 502 may receive the request 524 (or a separate request) from the UE 504, which may indicate a request to the network 502 to update a RAN notification area assigned to the UE 504.

At 710, the base station transmits, to the UE, a message configuring at least one beam notification area associated with positioning of the UE. The at least one beam notification area may include a set of beams, corresponding to a set of cells, identified as candidates to carry a paging message for the UE in the at least one beam notification area. For example, the message configuring the at least one beam notification area may include at least one BAI identifying the at least one beam notification area having the set of beams corresponding to the set of cells. The beam notification area update may be transmitted in one of an RRC signaling message, DCI and/or MAC CE. Each of the one or more beams may correspond to a respective SSB and/or CSI-RS. For example, the message may be based on the information associated with the set of measurements derived from the set of signals received via one or more of the set of beams.

In the context of FIG. 4, the first base station 402a may transmit, to the first UE 404a, a message configuring the first beam notification area 422a associated with positioning of the first UE 404a, with the first beam notification area 422a including a subset of the beams 410a that correspond to the first and second BAIs 424a-b, which may be candidates for carrying a paging message to the first UE 404a. In the context of FIG. 5, the network 502 may transmit, to the UE 504, the beam notification area update 526.

At 712, the base station transmits the paging message to the UE via one of the set of beams corresponding to one of the set of cells in which the UE is positioned based on the at least one beam notification area. In some aspects, an RRC protocol layer of the UE may be in an idle state or an inactive state when the base station transmits the paging message to the UE. In the context of FIG. 4, the first base station 402a may transmit a paging message to the first UE 404a via at least one of the subset of the beams 410a that corresponds to at least one of the first and second BAIs 424a-b based on the first beam notification area 422a. In the context of FIG. 5, the network 502 may transmit, to the UE 504, the paging message 528 from a first base station of the network 502 using a first beam of the one or more beams in a first cell of the one or more cells based on the beam notification area update 526.

Figure 8:
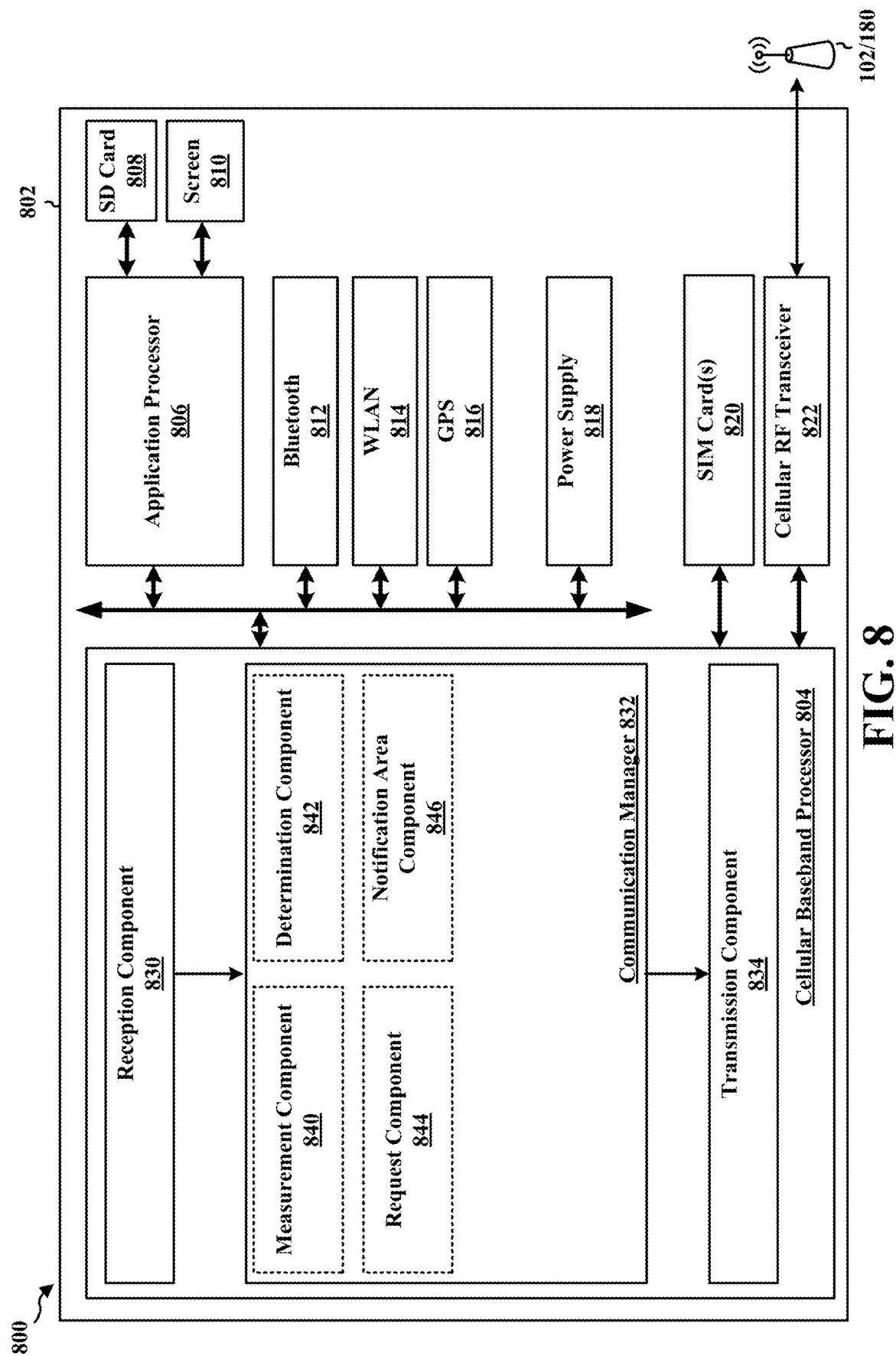
FIG. 8 is a diagram illustrating an example of a hardware implementation for an example apparatus.

FIG. 8 is a diagram 800 illustrating an example of a hardware implementation for an apparatus 802. The apparatus 802 may be a UE or similar device, or the apparatus 802 may be a component of a UE or similar device. The apparatus 802 may include a cellular baseband processor 804 (also referred to as a modem) and/or a cellular RF transceiver 822, which may be coupled together and/or integrated into the same package or module.

In some aspects, the apparatus 802 may accept or may include one or more subscriber identity modules (SIM) cards 820, which may include one or more integrated circuits, chips, or similar circuitry, and which may be removable or embedded. The one or more SIM cards 820 may carry identification and/or authentication information, such as an international mobile subscriber identity (IMSI) and/or IMSI-related key(s). Further, the apparatus 802 may include one or more of an application processor 806 coupled to a secure digital (SD) card 808 and a screen 810, a Bluetooth module 812, a wireless local area network (WLAN) module 814, a Global Positioning System (GPS) module 816, and/or a power supply 818.

The cellular baseband processor 804 communicates through the cellular RF transceiver 822 with the base station 102/180 or another network entity. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804.

In the context of FIG. 3, the cellular baseband processor 804 may be a component of the UE 350 and may include the memory 360 and/or at least one of the TX processor 368, the RX processor 356, and/or the controller/processor 359. In one configuration, the apparatus 802 may be a modem chip and/or may be implemented as the baseband processor 804, while in another configuration, the apparatus 802 may be the entire UE (e.g., the UE 350 of FIG. 3) and may include some or all of the abovementioned modules, components, and/or circuitry illustrated in the context of the apparatus 802. In one configuration, the cellular RF transceiver 822 may be implemented as at least one of the transmitter 354TX and/or the receiver 354RX.

The reception component 830 may be configured to receive signaling on a wireless channel, such as signaling from a base station 102/180 or other network entity. The transmission component 834 may be configured to transmit signaling on a wireless channel, such as signaling to a base station 102/180 or other network entity. The communication manager 832 may coordinate or manage some or all wireless communications by the apparatus 802, including across the reception component 830 and the transmission component 834.

The reception component 830 may provide some or all data and/or control information included in received signaling to the communication manager 832, and the communication manager 832 may generate and provide some or all of the data and/or control information to be included in transmitted signaling to the transmission component 834. The communication manager 832 may include the various illustrated components, including one or more components configured to process received data and/or control information, and/or one or more components configured to generate data and/or control information for transmission.

The communication manager 832 may include a measurement component 840, a determination component 842, a request component 844, and/or a notification area component 846. The measurement component 840 may be configured to derive a set of measurements from one or more signals received via one or more beams corresponding to one or more cells. The measurements may be L1 measurements. Additionally or alternatively, the measurement component 840 may determine a set of values that identifies the one or more beams—e.g., the one or more beams may be those beams via which signals having the highest L1 measurements were received.

The measurement component 840 may provide information associated with the set of measurements to the transmission component 834. Accordingly, the transmission component 834 may transmit, to the base station 102/180, the information associated with the set of measurements derived from one or more signals received via one or more beams corresponding to one or more cells, e.g., as described in connection with 602 of FIG. 6. In some aspects, the information associated with the set of measurements may include at least one of a set of L1 measurements derived from the one or more signals received via the one or more beams, or a set of values that identifies the one or more beams. The information associated with the set of measurements may indicate a request to include the one or more beams corresponding to the one or more cells in a beam notification area.

The determination component 842 may be configured to determine that an active beam corresponding to a serving cell is absent from another beam notification area configured by another message received from the base station 102/180, e.g., as described in connection with 604 of FIG. 6. In some aspects, the determination component 842 may identify each of a transmit beam and a receive beam via which the apparatus 802 is communicating data and/or control information with a base station, which may provide a cell on which the apparatus 802 is configured to operate or camp. Each of the two beams of which the beam pair is composed may be regarded as an "active" beam, e.g., unless a radio link failure is detected or intentionally closed. Each active beam may be associated with an ID, such as a value carried by pilot signals transmitted via the active beam, and/or other identifying information, such as information related to a spatial filter or other parameters/characteristics that may be used alone or in an aggregate form to uniquely distinguish one beam from other beams at the base station.

The request component 844 may request that the base station 102/180 update the other beam notification area based on the absence from the other beam notification area of the active beam corresponding to the serving cell, e.g., as described in connection with 606 of FIG. 6. According to various aspects, the request may be one of an explicit request or an implicit request, and may be transmitted in one of an RRC signaling message or a RACH message on a set of resources, which may be configured (or preconfigured) to indicate the request to update the other notification beam area.

In some aspects, for example, the request component 844 may be configured to request that the base station 102/180 update the at least one beam notification area by (1) generating an RRC message with at least one field including information explicitly requesting that the base station 102/180 update the other beam notification area, and (2) causing the transmission component 834 to transmit the RRC message to the base station 102/180. In some other aspects, the request component 844 may be configured to request that the base station 102/180 update the at least one beam notification area by (1) selecting a set of resources on a RACH that are configured to implicitly request the base station 102/180 to update the at least one beam notification area, (2) mapping an RA message to the selected set of RACH resources, and (3) transmitting the mapped RA message to the base station 102/180 on the selected set of RACH resources.

Through the reception component 830, the notification area component 846 may receive, from the base station 102/180, a RAN notification area message configuring a set of RAIs, e.g., as described in connection with 608 of FIG. 6. Each RAI may identify a RAN notification area that includes a set of BAIs. For example, each of the RAIs may indicate a set of cells in which the apparatus 802 may be positioned. In some aspects, the apparatus 802 may receive a RAN notification area update that configures a set of RAIs in response to transmitting a RAN notification area update request. In some aspects, the RAN notification update request may be included in or indicated by the aforementioned request to update the other beam notification area. In other aspects, the RAN notification update request may be separate from the aforementioned request to update the other beam notification area.

Similarly through the reception component 830, the notification area component 846 may receive, from the base station 102/180, a message configuring at least one beam notification area associated with positioning of the apparatus 802, e.g., as described in connection with 610 of FIG. 6. The at least one beam notification area may include a set of beams corresponding to a set of cells identified by the base station 102/180 as candidates for carrying a paging message for the apparatus 802 in the at least one beam notification area. For example, the message configuring the at least one beam notification area may include at least one BAI identifying the at least one beam notification area having the set of beams corresponding to the set of cells. The beam notification area update may be received in one of an RRC signaling message, DCI and/or MAC CE. Each of the one or more beams may correspond to a respective SSB and/or CSI-RS. For example, the message may be based on the information associated with the set of measurements derived from the set of signals received via one or more of the set of beams.

The reception component 830 may be configured to receive the paging message from the base station 102/180 via one of the set of beams corresponding to one of the set of cells in which the apparatus 802 is positioned based on the at least one beam notification area, e.g., as described in connection with 612 of FIG. 6. In some aspects, an RRC protocol layer of the apparatus 802 may be in an idle state or an inactive state when receiving the paging message.

The apparatus 802 may include additional components that perform some or all of the blocks, operations, signaling, etc. of the algorithm(s) in the aforementioned flowchart of FIG. 6. As such, some or all of the blocks, operations, signaling, etc. in the aforementioned flowchart of FIG. 6 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a network, a message configuring at least one beam notification area associated with positioning of the apparatus 802, the at least one beam notification area including a set of beams corresponding to a set of cells identified by the network as candidates for carrying a paging message for the apparatus 802 in the at least one beam notification area; and means for receiving the paging message from the network via one of the set of beams corresponding to one of the set of cells in which the apparatus 802 is positioned based on the at least one beam notification area.

In one configuration, an RRC layer of a protocol stack of the apparatus 802 is in an idle state or an inactive state when receiving the paging message.

In one configuration, the apparatus 802, and in particular the cellular baseband processor 804, may further include means for determining that an active beam corresponding to a serving cell is absent from another beam notification area configured by another message received from the network; and means for requesting that the network update the other beam notification area based on the absence of the active beam corresponding to the serving cell, and the message configuring the at least one beam notification area includes an update of the other beam notification area to include the active beam corresponding to the serving cell.

In one configuration, the means for requesting that the network update the at least one beam notification area is configured to: transmit an RRC message to the network, and at least one field of the RRC message includes information explicitly requesting to the network to update the other beam notification area.

In one configuration, the means for requesting that the network update the at least one beam notification area is configured to: transmit a RA message to the network on a set of resources of a RACH, and the set of resources of the RACH carrying the RA message includes an implicit request to the network to update the other beam notification area.

In one configuration, the message configuring the at least one beam notification area includes at least one BAI identifying the at least one beam notification area that includes the set of beams corresponding to the set of cells.

In one configuration, the apparatus 802, and in particular the cellular baseband processor 804, may further include means for receiving, from the network, a RAN notification area message configuring a set of RAIs, each RAI identifying a RAN notification area that includes a set of BAIs.

In one configuration, the apparatus 802, and in particular the cellular baseband processor 804, may further include means for transmitting, to the network, information associated with a set of measurements derived from one or more signals received by the apparatus 802 via one or more beams corresponding to one or more cells, and the message configuring the at least one beam notification area associated with the positioning of the apparatus 802 is based on the information associated with the set of measurements.

In one configuration, the information associated with the set of measurements includes at least one of a set of L1 measurements derived from the one or more signals received by the apparatus 802 via the one or more beams corresponding to the one or more cells, or a set of values that identifies the one or more beams, and the information associated with the set of measurements includes a request to include the one or more beams corresponding to the one or more cells in the at least one beam notification area.

In one configuration, each of the one or more signals received via the one or more beams includes at least one of a SS/PBCH block or a CSI-RS.

In one configuration, the message configuring the at least one beam notification area is received from the network in at least one of an RRC signaling message, a DCI message, or a MAC CE.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
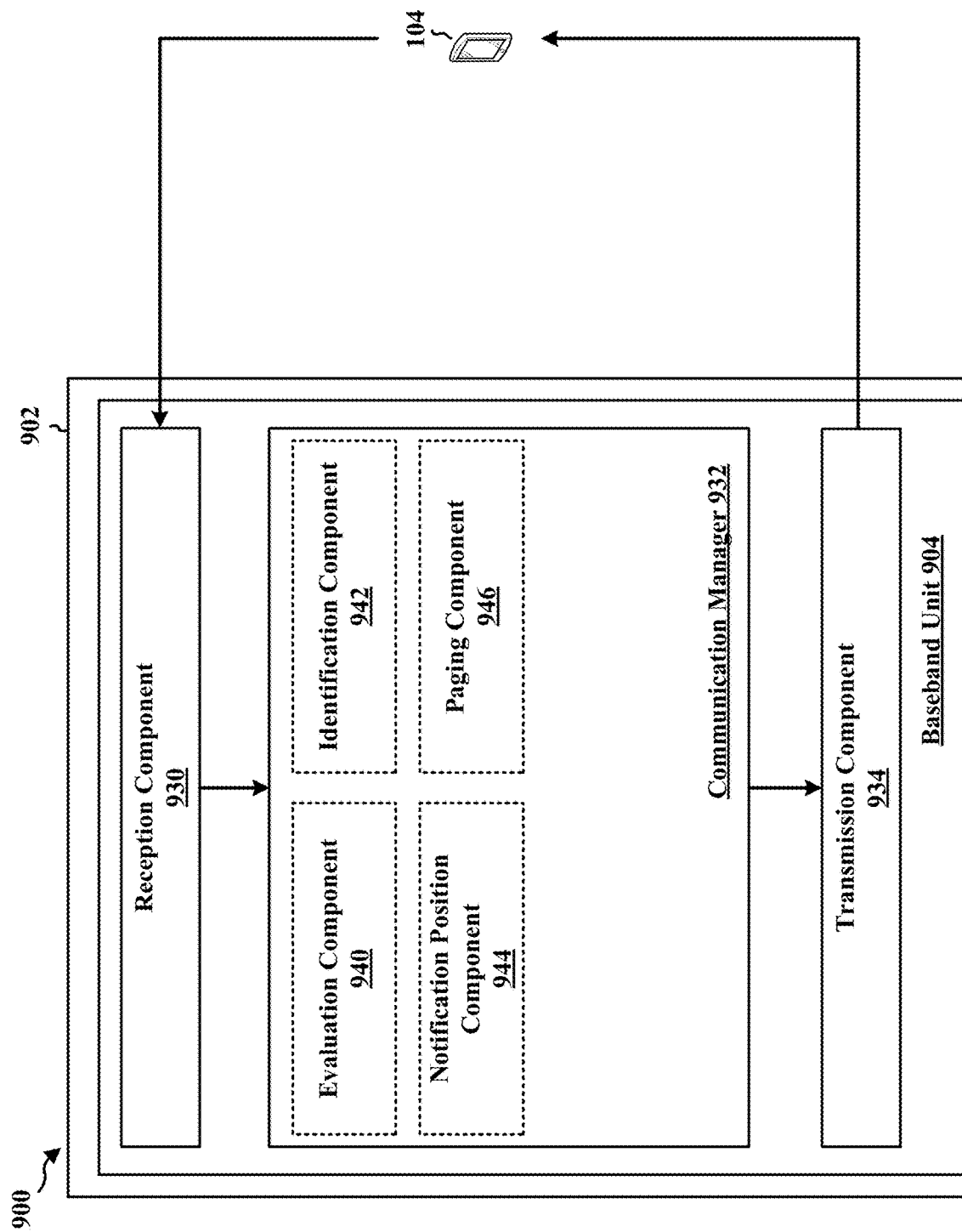
FIG. 9 is a diagram illustrating another example of a hardware implementation for another example apparatus.

FIG. 9 is a diagram 900 illustrating an example of a hardware implementation for an apparatus 902. The apparatus 902 may be, or may be a component of, a base station, network entity (e.g., implementing a network function), or similar device or system. The apparatus 902 may include a baseband unit 904. The baseband unit 904 may communicate through a cellular RF transceiver. For example, the baseband unit 904 may communicate through a cellular RF transceiver with a UE 104, such as for downlink and/or uplink communication, and/or with a base station, such as for IAB. In some other aspects, the apparatus 902 may indirectly communicate with the UE 104, with a base station providing at least one hop to the UE 104; the apparatus 902 may be connected with such a base station via wireless or wireline connection.

The baseband unit 904 may include a computer-readable medium/memory, which may be non-transitory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The reception component 930 may be configured to receive signaling on a wireless channel, such as signaling from a UE 104 or other device. The transmission component 934 may be configured to transmit signaling on a wireless channel, such as signaling to a UE 104 or other device. The communication manager 932 may coordinate or manage some or all wireless communications by the apparatus 902, including across the reception component 930 and the transmission component 934.

The reception component 930 may provide some or all data and/or control information included in received signaling to the communication manager 932, and the communication manager 932 may generate and provide some or all of the data and/or control information to be included in transmitted signaling to the transmission component 934. The communication manager 932 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a network entity and/or core network, such as the core network 190 or the EPC 160, for transmission.

The communication manager 932 may include an evaluation component 940, an identification component 942, a notification position component 944, and a paging component 946. The evaluation component 940, via the reception component 930, may be configured to receive, from the UE 104, information associated with a set of measurements derived from one or more signals transmitted via one or more beams corresponding to one or more cells, e.g., as described in connection with 702 of FIG. 7. The evaluation component 940 may select beams on which the UE 104 may be paged based on evaluating the information associated with the set of measurements.

In some aspects, the information associated with the set of measurements may include at least one of a set of L1 measurements derived from one or more signals received by the UE via the one or more beams, and the evaluation component 940 may select beams corresponding to the highest L1 measurements and/or the beams corresponding to the L1 measurements that exceed a threshold. In some other aspects, the information associated with the set of measurements may include a set of values that identifies the one or more beams. The information associated with the set of measurements may indicate a request to include the one or more beams corresponding to the one or more cells in a beam notification area. Potentially, the evaluation component 940 may determine whether to grant the request, e.g., by assigning a requested beam to the notification area for the UE 104.

The identification component 942, through the reception component 930, may receive, from the UE 104, a request to update another beam notification area based on an absence of an active beam from the other beam notification area, e.g., as described in connection with 704 of FIG. 7. The active beam may correspond to a serving cell in which the UE 104 is positioned. According to various aspects, the request may be one of an explicit request or an implicit request, and may be received in one of an RRC signaling message or a RACH message on a set of resources, which may be configured (or preconfigured) to indicate the request to update the other notification beam area.

In some aspects, the identification component 942 may receive the request to update as an RRC message with at least one field including information explicitly requesting to update the other beam notification area. The identification component 942 may identify the beam absent from the beam notification area of the UE 104, and the identification component 942 may provide information identifying the beam to the notification position component 944. In some other aspects, the identification component 942 may receive the request to update as an RA message from the UE 104 on a set of resources of a RACH, with the set of resources of the RACH carrying the RA message being an implicit request to update the other beam notification area. The identification component 942 may identify the beam requested by the UE 104 to be included in the beam notification area by identifying a beam ID to which the resources map when an RA message is carried thereon and providing information identifying the beam to the notification position component 944.

The notification position component 944 may be configured to update at least one beam notification area to include the active beam with the other beam notification area based on the request received from the UE 104, e.g., as described in connection with 706 of FIG. 7. For example, the notification position component 944 may associate the active beam with the UE 104, such as by storing information indicating an association therebetween. The notification position component 944 may reconfigure the beam notification area for the UE 104 to include a BAI that includes the active beam.

Through the transmission component 934, the notification position component 944 may transmit, to the UE 104, a RAN notification area message configuring a set of RAIs, e.g., as described in connection with 708 of FIG. 7. Each RAI may identify a RAN notification area that includes a set of BAIs. For example, each of the RAIs may indicate a set of cells in which the UE may be positioned—e.g., the UE is estimated to be camped on one of the cells included in a RAN notification area at any given time. In some aspects, the notification position component 944 may cause transmission of a RAN notification area update that configures a set of RAIs in response to receiving a RAN notification area update request from the UE 104. In some aspects, the RAN notification update request may be included in or indicated by the aforementioned request to update the other beam notification area. In other aspects, the RAN notification update request may be separate from the aforementioned request to update the other beam notification area.

Further, the notification position component 944 may cause the transmission component 934 to transmit, to the UE 104, a message configuring at least one beam notification area associated with positioning of the UE 104, e.g., as described in connection with 710 of FIG. 7. The at least one beam notification area may include a set of beams, corresponding to a set of cells, identified as candidates to carry a paging message for the UE 104 in the at least one beam notification area. For example, the message configuring the at least one beam notification area may include at least one BAI identifying the at least one beam notification area having the set of beams corresponding to the set of cells. The beam notification area update may be transmitted in one of an RRC signaling message, DCI and/or MAC CE. Each of the one or more beams may correspond to a respective SSB and/or CSI-RS. For example, the message may be based on the information associated with the set of measurements derived from the set of signals received via one or more of the set of beams.

The paging component 946 may cause the transmission component 934 to transmit a paging message to the UE 104 via one of the set of beams corresponding to one of the set of cells in which the UE is positioned based on the at least one beam notification area, e.g., as described in connection with 712 of FIG. 7. In some aspects, an RRC protocol layer of the UE 104 may be in an idle state or an inactive state when the paging message is transmitted to the UE 104.

The apparatus 902 may include additional components that perform some or all of the blocks, operations, signaling, etc. of the algorithm(s) in the aforementioned flowchart of FIG. 7. As such, some or all of the blocks, operations, signaling, etc. in the aforementioned flowchart of FIG. 7 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to a UE, a message configuring at least one beam notification area associated with positioning of the UE, the at least one beam notification area including a set of beams corresponding to a set of cells identified as candidates for carrying a paging message for the UE in the at least one beam notification area; and means for transmitting the paging message to the UE via one of the set of beams corresponding to one of the set of cells in which the UE is positioned based on the at least one beam notification area.

In one configuration, an RRC layer of a protocol stack of the UE is in an idle state or an inactive state when transmitting the paging message.

In one configuration, the apparatus 902, and in particular the baseband unit 904, includes may further include means for receiving, from the UE, a request to update another beam notification area based on an absence of an active beam from the other beam notification area, the active beam corresponding to a serving cell in which the UE is positioned; and means for updating the at least one beam notification area to include the active beam with the other beam notification area based on the request received from the UE.

In one configuration, the means for receiving, from the UE, the request to update the other beam notification area is configured to receive an RRC message from the UE, and at least one field of the RRC message includes information explicitly requesting to update the other beam notification area to include the active beam.

In one configuration, the means for receiving, from the UE, the request to update the other beam notification area is configured to receive a RA message from the UE on a set of resources of a RACH, and the set of resources of the RACH carrying the RA message includes an implicit request to the network to update the other beam notification area.

In one configuration, the message configuring the at least one beam notification area includes at least one BAI identifying the at least one beam notification area that includes the set of beams corresponding to the set of cells.

In one configuration, the apparatus 902, and in particular the baseband unit 904, includes may further include means for transmitting, to the UE, a RAN notification area message configuring a set of RAIs for the UE, each RAI identifying a RAN notification area that includes a set of beam notification areas.

In one configuration, the apparatus 902, and in particular the baseband unit 904, includes may further include means for receiving, from the UE, information associated with a set of measurements derived from one or more signals transmitted via one or more beams corresponding to one or more cells, and the at least one beam notification area associated with the positioning of the UE is based on the information associated with the set of measurements.

In one configuration, the information associated with the set of measurements includes at least one of a set of L1 measurements derived from the one or more signals transmitted via the one or more beams corresponding to the one or more cells, or a set of values that identifies the one or more beams, and the information associated with the set of measurements includes a request to include the one or more beams corresponding to the one or more cells in the at least one beam notification area.

In one configuration, at least one of the one or more signals transmitted via the one or more beams includes a SS/PBCH block or a CSI-RS transmitted by the apparatus 902.

In one configuration, the message configuring the at least one beam notification area is included in at least one of an RRC signaling message, a DCI message, or a MAC CE.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects or other teachings and disclosure described herein, without limitation.

Example 1 is an apparatus for wireless communication at a UE that is configured to: receive, from a network, a message configuring at least one beam notification area associated with positioning of the UE, the at least one beam notification area including a set of beams corresponding to a set of cells identified by the network as candidates for carrying a paging message for the UE in the at least one beam notification area; and receive the paging message from the network via one of the set of beams corresponding to one of the set of cells in which the UE is positioned based on the at least one beam notification area.

Example 2 may include the apparatus of Example 1, and an RRC layer of a protocol stack of the UE is in an idle state or an inactive state when receiving the paging message.

Example 3 may include the apparatus of Example 1, and further configured to: determine that an active beam corresponding to a serving cell is absent from another beam notification area configured by another message received from the network;

and request that the network update the other beam notification area based on the absence of the active beam corresponding to the serving cell, and the message configuring the at least one beam notification area includes an update of the other beam notification area to include the active beam corresponding to the serving cell.

Example 4 may include the apparatus of Example 3, and the request that the network update the at least one beam notification area includes transmission an RRC message to the network, and at least one field of the RRC message includes information explicitly requesting to the network to update the other beam notification area.

Example 5 may include the apparatus of Example 3, and the request that the network update the at least one beam notification area includes transmission of an RA message to the network on a set of resources of a RACH, and the set of resources of the RACH carrying the RA message includes an implicit request to the network to update the other beam notification area.

Example 6 may include the apparatus of Example 1, and the message configuring the at least one beam notification area includes at least one BAI identifying the at least one beam notification area that includes the set of beams corresponding to the set of cells.

Example 7 may include the apparatus of Example 6, and further configured to: receive, from the network, a RAN notification area message configuring a set of RAIs, with each RAI identifying a RAN notification area that includes a set of BAIs.

Example 8 may include the apparatus of Example 1, and further configured to: transmit, to the network, information associated with a set of measurements derived from one or more signals received by the UE via one or more beams corresponding to one or more cells, and the message configuring the at least one beam notification area associated with the positioning of the UE is based on the information associated with the set of measurements.

Example 9 may include the apparatus of Example 8, and the information associated with the set of measurements includes at least one of a set of L1 measurements derived from the one or more signals received by the UE via the one or more beams corresponding to the one or more cells, or a set of values that identifies the one or more beams, and the information associated with the set of measurements includes a request to include the one or more beams corresponding to the one or more cells in the at least one beam notification area.

Example 10 may include the apparatus of Example 8, and each of the one or more signals received via the one or more beams includes at least one of a SS/PBCH block or a CSI-RS.

Example 11 may include the apparatus of Example 1, and the message configuring the at least one beam notification area is received from the network in at least one of a RRC signaling message, a DCI message, or a MAC CE.

Example 12 is an apparatus for wireless communication at a base station that is configured to: transmit, to a UE, a message configuring at least one beam notification area associated with positioning of the UE, the at least one beam notification area including a set of beams corresponding to a set of cells identified as candidates for carrying a paging message for the UE in the at least one beam notification area; and transmit the paging message to the UE via one of the set of beams corresponding to one of the set of cells in which the UE is positioned based on the at least one beam notification area.

Example 13 may include the apparatus of Example 12, and an RRC layer of a protocol stack of the UE is in an idle state or an inactive state when transmitting the paging message.

Example 14 may include the apparatus of Example 12, and further configured to: receive, from the UE, a request to update another beam notification area based on an absence of an active beam from the other beam notification area, the active beam corresponding to a serving cell in which the UE is positioned; and update the at least one beam notification area to include the active beam with the other beam notification area based on the request received from the UE.

Example 15 may include the apparatus of Example 14, and the reception, from the UE, of the request to update the other beam notification area includes reception of an RRC message from the UE, and at least one field of the RRC message includes information explicitly requesting to update the other beam notification area to include the active beam.

Example 16 may include the apparatus of Example 14, and the reception, from the UE, of the request to update the other beam notification area includes reception of an RA message from the UE on a set of resources of an RACH, and the set of resources of the RACH carrying the RA message includes an implicit request to the network to update the other beam notification area.

Example 17 may include the apparatus of Example 12, and the message configuring the at least one beam notification area includes at least one BAI identifying the at least one beam notification area that includes the set of beams corresponding to the set of cells.

Example 18 may include the apparatus of Example 17, and further configured to: transmit, to the UE, a RAN notification area message configuring a set of RAIs for the UE, each RAI identifying a RAN notification area that includes a set of beam notification areas.

Example 19 may include the apparatus of Example 12, and further configured to: receive, from the UE, information associated with a set of measurements derived from one or more signals transmitted via one or more beams corresponding to one or more cells, and the at least one beam notification area associated with the positioning of the UE is based on the information associated with the set of measurements.

Example 20 may include the apparatus of Example 19, and the information associated with the set of measurements includes at least one of a set of L1 measurements derived from the one or more signals transmitted via the one or more beams corresponding to the one or more cells, or a set of values that identifies the one or more beams, and the information associated with the set of measurements includes a request to include the one or more beams corresponding to the one or more cells in the at least one beam notification area.

Example 21 may include the apparatus of Example 19, and at least one of the one or more signals transmitted via the one or more beams includes an SS/PBCH block or a CSI-RS transmitted by the apparatus.

Example 22 may include the apparatus of Example 12, and the message configuring the at least one beam notification area is included in at least one of a RRC signaling message, a DCI message, or a MAC CE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include some communication and/or memory operations/procedures through which some information or value(s) are acquired, such as "receiving" (e.g., receiving information), "accessing" (e.g., accessing data in a memory), "detecting," and the like.

As another example, reference to an element in the singular is not intended to mean "one and only one" unless specifically so stated, but rather "one or more." In particular, reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    receiving, from a network, a message configuring at least one beam notification area associated with positioning of the UE, the message configuring the at least one beam notification area comprising at least one Beam Area Identifier (BAI) identifying the at least one beam notification area comprising a set of beams corresponding to a set of cells identified by the network as candidates for carrying a paging message for the UE in the at least one beam notification area; and
    receiving the paging message from the network via one of the set of beams corresponding to one of the set of cells in which the UE is positioned based on the at least one beam notification area.

2. The method of claim 1, wherein a radio resource control (RRC) layer of a protocol stack of the UE is in an idle state or an inactive state when receiving the paging message.

3. The method of claim 1, further comprising:
    determining that an active beam corresponding to a serving cell is absent from another beam notification area configured by another message received from the network; and
    requesting that the network update the other beam notification area based on the absence of the active beam corresponding to the serving cell, wherein
    the message configuring the at least one beam notification area comprises an update of the other beam notification area to include the active beam corresponding to the serving cell.

4. The method of claim 3, wherein the requesting that the network update the at least one beam notification area comprises:
    transmitting a radio resource control (RRC) message to the network, wherein at least one field of the RRC message includes information explicitly requesting to the network to update the other beam notification area.

5. The method of claim 3, wherein the requesting that the network update the at least one beam notification area comprises:
    transmitting a random access (RA) message to the network on a set of resources of an RA channel (RACH), wherein the set of resources of the RACH carrying the RA message comprises an implicit request to the network to update the other beam notification area.

6. The method of claim 1, further comprising:
    receiving, from the network, a radio access network (RAN) notification area message configuring a set of RAN area identifiers (RAIs), each RAI identifying a RAN notification area that includes a set of BAIs.

7. The method of claim 1, further comprising:
    transmitting, to the network, information associated with a set of measurements derived from one or more signals received by the UE via one or more beams corresponding to one or more cells,
    wherein the message configuring the at least one beam notification area associated with the positioning of the UE is based on the information associated with the set of measurements.

8. The method of claim 7, wherein the information associated with the set of measurements comprises at least one of:
    a set of layer 1 (L1) measurements derived from the one or more signals received by the UE via the one or more beams corresponding to the one or more cells, or
    a set of values that identifies the one or more beams, and wherein the information associated with the set of measurements comprises a request to include the one or more beams corresponding to the one or more cells in the at least one beam notification area.

9. The method of claim 7, wherein each of the one or more signals received via the one or more beams comprises at least one of a synchronization signal (SS)/physical broadcast channel (PBCH) block or a channel state information reference signal (CSI-RS).

10. The method of claim 1, wherein the message configuring the at least one beam notification area is received from the network in at least one of a radio resource control (RRC) signaling message, a downlink control information (DCI) message, or a medium access control (MAC) control element (CE).

11. A method of wireless communication by an apparatus of an access network, comprising:
    transmitting, to a user equipment (UE), a message configuring at least one beam notification area associated with positioning of the UE, the message configuring the at least one beam notification area comprising at least one beam area identifier identifying the at least one beam notification area comprising a set of beams corresponding to a set of cells identified as candidates for carrying a paging message for the UE in the at least one beam notification area; and
    transmitting the paging message to the UE via one of the set of beams corresponding to one of the set of cells in which the UE is positioned based on the at least one beam notification area.

12. The method of claim 11, wherein a radio resource control (RRC) layer of a protocol stack of the UE is in an idle state or an inactive state when transmitting the paging message.

13. The method of claim 11, further comprising:
    receiving, from the UE, a request to update another beam notification area based on an absence of an active beam from the other beam notification area, the active beam corresponding to a serving cell in which the UE is positioned; and updating the at least one beam notification area to include the active beam with the other beam notification area based on the request received from the UE.

14. The method of claim 13, wherein the receiving, from the UE, the request to update the other beam notification area comprises:

receiving a radio resource control (RRC) message from the UE, wherein at least one field of the RRC message includes information explicitly requesting to update the other beam notification area to include the active beam.

15. The method of claim 13, wherein the receiving, from the UE, the request to update the other beam notification area comprises:

receiving a random access (RA) message from the UE on a set of resources of an RA channel (RACH), wherein the set of resources of the RACH carrying the RA message comprises an implicit request to the network to update the other beam notification area.

16. The method of claim 11, further comprising:

transmitting, to the UE, a radio access network (RAN) notification area message configuring a set of RAN area identifiers (RAIs) for the UE, each RAI identifying a RAN notification area that includes a set of beam notification areas.

17. The method of claim 11, further comprising:

receiving, from the UE, information associated with a set of measurements derived from one or more signals transmitted via one or more beams corresponding to one or more cells, wherein the at least one beam notification area associated with the positioning of the UE is based on the information associated with the set of measurements.

18. The method of claim 17, wherein the information associated with the set of measurements comprises at least one of:

a set of layer 1 (L1) measurements derived from the one or more signals transmitted via the one or more beams corresponding to the one or more cells, or a set of values that identifies the one or more beams, and wherein the information associated with the set of measurements comprises a request to include the one or more beams corresponding to the one or more cells in the at least one beam notification area.

19. The method of claim 17, wherein at least one of the one or more signals transmitted via the one or more beams comprises a synchronization signal (SS)/physical broadcast channel (PBCH) block or a channel state information reference signal (CSI-RS) transmitted by a base station of the access network.

20. The method of claim 11, wherein the message configuring the at least one beam notification area is included in at least one of a radio resource control (RRC) signaling message, a downlink control information (DCI) message, or a medium access control (MAC) control element (CE).

21. An apparatus for wireless communication at a user equipment (UE), comprising:

a memory; and at least one processor coupled to the memory and configured to:

receive, from a network, a message configuring at least one beam notification area associated with positioning of the UE, the message configuring the at least one beam notification area comprising at least one beam area identifier identifying the at least one beam notification area comprising a set of beams corresponding to a set of cells identified by the network as candidates for carrying a paging message for the UE in the at least one beam notification area; and receive the paging message from the network via one of the set of beams corresponding to one of the set of cells in which the UE is positioned based on the at least one beam notification area.

22. The apparatus of claim 21, wherein a radio resource control (RRC) layer of a protocol stack of the UE is in an idle state or an inactive state.

23. The apparatus of claim 21, wherein the at least one processor is further configured to:

determine that an active beam corresponding to a serving cell is absent from another beam notification area configured by another message received from the network; and request that the network update the other beam notification area based on the absence of the active beam corresponding to the serving cell, wherein the message configuring the at least one beam notification area comprises an update of the other beam notification area to include the active beam corresponding to the serving cell.

24. The apparatus of claim 23, wherein to request that the network update the at least one beam notification area comprises to transmit a radio resource control (RRC) message to the network, wherein at least one field of the RRC message includes information explicitly requesting to the network to update the other beam notification area.

25. The apparatus of claim 23, wherein to request that the network update the at least one beam notification area comprises to:

transmit a random access (RA) message to the network on a set of resources of an RA channel (RACH), wherein the set of resources of the RACH carrying the RA message comprises an implicit request to the network to update the other beam notification area.

26. The apparatus of claim 21, wherein the at least one processor is further configured to:

receive, from the network, a radio access network (RAN) notification area message configuring a set of RAN area identifiers (RAIs), each RAI identifying a RAN notification area that includes a set of BAIs.

27. The apparatus of claim 21, wherein the at least one processor is further configured to:

transmit, to the network, information associated with a set of measurements derived from one or more signals received by the UE via one or more beams corresponding to one or more cells, wherein the message configuring the at least one beam notification area associated with the positioning of the UE is based on the information associated with the set of measurements.

28. An apparatus for configuring wireless communication in an access network, comprising:

a memory; and at least one processor coupled to the memory and configured to:

transmit, to a user equipment (UE), a message configuring at least one beam notification area associated with positioning of the UE, the message configuring the at least one beam notification area comprising at least one beam area identifier identifying the at least one beam notification area comprising a set of beams corresponding to a set of cells identified as candidates for carrying a paging message for the UE in the at least one beam notification area; and transmit the paging message to the UE via one of the set of beams corresponding to one of the set of cells in which the UE is positioned based on the at least one beam notification area.

29. The apparatus of claim 28, wherein a radio resource control (RRC) layer of a protocol stack of the UE is in an idle state or an inactive state when transmitting the paging message.

30. The apparatus of claim 28, wherein the at least one processor is further configured to:

receive, from the UE, a request to update another beam notification area based on an absence of an active beam from the other beam notification area, the active beam corresponding to a serving cell in which the UE is positioned; and update the at least one beam notification area to include the active beam with the other beam notification area based on the request received from the UE.

* * * * *